United States Patent
Yada et al.

(10) Patent No.: US 11,990,822 B2
(45) Date of Patent: May 21, 2024

(54) VEHICLE POWER UNIT AND VEHICLE WHEEL BEARING WITH GENERATOR

(71) Applicant: NTN CORPORATION, Osaka (JP)

(72) Inventors: Yuuji Yada, Iwata (JP); Kentaro Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 818 days.

(21) Appl. No.: 16/952,878

(22) Filed: Nov. 19, 2020

(65) Prior Publication Data
US 2021/0070163 A1 Mar. 11, 2021

Related U.S. Application Data

(63) Continuation of application No. PCT/JP2019/019807, filed on May 17, 2019.

(30) Foreign Application Priority Data

May 21, 2018 (JP) ................. 2018-097100

(51) Int. Cl.
*H02K 7/08* (2006.01)
*H02K 7/00* (2006.01)
(Continued)

(52) U.S. Cl.
CPC ............... *H02K 7/08* (2013.01); *H02K 7/006* (2013.01); *H02K 7/102* (2013.01); *H02K 7/14* (2013.01);
(Continued)

(58) Field of Classification Search
CPC .......... H02K 7/006; H02K 7/08; H02K 7/083; H02K 7/085; H02K 7/00; H02K 7/14;
(Continued)

(56) References Cited

U.S. PATENT DOCUMENTS 7,528,518 B2  5/2009 Maeda et al.
8,403,087 B2  3/2013 Park et al.
(Continued)

FOREIGN PATENT DOCUMENTS

CN  102686435 A  9/2012
CN  102774271 A  11/2012
(Continued)

OTHER PUBLICATIONS

International Preliminary Report on Patentability dated December 3, 2020 with Written Opinion of the International Searching Authority issued in International Patent Application No. PCT/JP2019/019807.
(Continued)

*Primary Examiner* — Alexander A Singh

(57) ABSTRACT

Provided is a vehicle power unit as well as a vehicle wheel bearing assembly with a generator which allow a wheel bearing to be easily replaced and thereby can suppress the costs of replacement components. The vehicle power unit includes: a wheel bearing including an outer ring and a hub axle that includes a hub flange and is rotatably supported by the outer ring through a rolling element, the hub flange being configured to be attached with a wheel and a brake rotor of a vehicle; and a motor or a generator including a stator located on an outer periphery of the outer ring and a rotor located on an outer periphery of the stator and attached to the hub axle. The vehicle includes a knuckle provided with a wheel bearing fixing member. The outer ring or the stator is removably fixed to the wheel bearing fixing member.

8 Claims, 15 Drawing Sheets

(51) Int. Cl.
*H02K 7/102* (2006.01)
*H02K 7/14* (2006.01)
*H02K 7/18* (2006.01)
*B60B 27/00* (2006.01)
*B60K 7/00* (2006.01)

(52) U.S. Cl.
CPC ........ *H02K 7/1846* (2013.01); *B60B 27/0015* (2013.01); *B60B 27/0094* (2013.01); *B60K 7/0007* (2013.01)

(58) Field of Classification Search
CPC ...... H02K 7/102; H02K 7/106; H02K 7/1846; B60B 27/0015; B60B 27/0047; B60B 27/0052; B60B 27/0094; B60K 7/0007; B60K 2007/0092; B60K 2007/0038; B60Y 2410/102
USPC ............................... 310/750, 74, 75 R, 75 C
See application file for complete search history.

(56) References Cited

U.S. PATENT DOCUMENTS

| | | | |
|---|---|---|---|
| 8,581,457 B2 | 11/2013 | Takahashi et al. | |
| 10,047,808 B2* | 8/2018 | Szewczyk | B60B 25/004 |
| 10,752,104 B2 | 8/2020 | Kawamura et al. | |
| 10,836,247 B2 | 11/2020 | Kawamura et al. | |
| 2006/0158050 A1* | 7/2006 | Maeda | H02K 7/14 310/58 |
| 2011/0031803 A1 | 2/2011 | Park et al. | |
| 2012/0229004 A1 | 9/2012 | Takahashi et al. | |
| 2017/0110933 A1* | 4/2017 | Michel | H02K 5/203 |
| 2018/0326833 A1* | 11/2018 | Kurita | B60K 7/0023 |
| 2019/0217696 A1 | 7/2019 | Kawamura et al. | |
| 2019/0248225 A1 | 8/2019 | Kawamura et al. | |

FOREIGN PATENT DOCUMENTS

| | | |
|---|---|---|
| CN | 104385900 A | 3/2015 |
| JP | 2005-186667 | 7/2005 |
| JP | 2006-117124 | 5/2006 |
| JP | 2006-199107 A | 8/2006 |
| JP | 2008-22637 A | 1/2008 |
| JP | 2011-519544 A | 7/2011 |
| JP | 2018-52482 A | 4/2018 |
| JP | 2018-57255 A | 4/2018 |
| WO | 2009/128581 A1 | 10/2009 |
| WO | WO 2018/056219 A1 | 3/2018 |

OTHER PUBLICATIONS

Extended and Supplementary European Search Report dated Feb. 1, 2022 in European Patent Application No. 19807053.4 (10 pages).
Japanese Notice of Allowance dated Apr. 5, 2022 in Japanese Patent Application No. 2018-097100 (3 pages; 2 pages English translation).
First Examination Report dated Apr. 28, 2022 in Indian Patent Application No. 202017050899 (7 pages).
International Search Report dated Aug. 20, 2019 in International Patent Application No. PCT/JP2019/019807.

* cited by examiner

OUTBOARD SIDE ← → INBOARD SIDE

PRIOR ART

PRIOR ART

VEHICLE POWER UNIT AND VEHICLE WHEEL BEARING WITH GENERATOR

CROSS REFERENCE TO THE RELATED APPLICATION

This application is a continuation application, under 35 U.S.C. § 111(a), of international application No. PCT/JP2019/019807, filed May 17, 2019, which is based on and claims Convention priority to Japanese patent application No. 2018-097100, filed May 21, 2018, the entire disclosures of all of which are herein incorporated by reference as a part of this application.

BACKGROUND OF THE INVENTION

Field of the Invention

The present invention relates to a vehicle power unit, to a vehicle wheel bearing assembly with a generator, and to a technology applied to vehicles.

Description of Related Art

A vehicle power unit having a motor incorporated inside a wheel is a device integrally including a wheel bearing for supporting the wheel and a motor for driving and power regeneration of the wheel and provides many advantages such as drive assistance for a vehicle, power regeneration during deceleration, and attitude stabilization through torque control of each wheel, and the demand for such vehicle power units is expected to increase in the future in connection with electric motorization of vehicles.

The following describes a wheel bearing device which has previously been proposed by the present applicant (Patent Document 1). In particular, the wheel bearing device shown in this conventional example is small in size and can be disposed on an inner diametric side with respect to a brake rotor outer peripheral part so that it is easy to replace an existing wheel bearing with the wheel bearing device. FIG. 14 is a sectional view of the vehicle power unit including a drive motor with a power generation function. FIG. 15 is a sectional view along XV-XV of FIG. 14. As shown in FIG. 14 and FIG. 15, the vehicle power unit including the drive motor with the power generation function can be disposed inside an inner periphery of a brake rotor 70. A motor stator core 74 is fixed to a knuckle 71 that is a vehicle fixing component through a wheel bearing outer ring 72 and a motor stator fixing part 73. Motor winding coils 75 for flowing current so as to generate a magnetic force are wound around the motor stator core 74. A motor rotor casing 77 and a motor rotor 78 are attached to a wheel bearing flange 76 and rotate about the motor stator core 74. The motor integrated with the wheel bearing is used to perform driving and power regeneration in accordance with vehicle traveling conditions.

RELATED DOCUMENT

Patent Document

[Patent Document 1] JP Laid-open Patent Publication No. 2018-052482

SUMMARY OF THE INVENTION

The conventional vehicle power unit requires replacement of the entire vehicle power unit including the motor when the wheel bearing has abnormality or is deteriorated. Thus, replacement work is difficult to perform, and the costs of replacement components increase.

An object of the present invention is to provide a vehicle power unit as well as a vehicle wheel bearing assembly with a generator which allow a wheel bearing to be easily replaced and thereby can suppress the costs of replacement components.

According to the present invention, a vehicle power unit includes: a wheel bearing including an outer ring and a hub axle that includes a hub flange and is rotatably supported by the outer ring through a rolling element, the hub flange being configured to be attached with a wheel and a brake rotor of a vehicle; and a motor including a stator located on an outer periphery of the outer ring and a rotor located on an outer periphery of the stator and attached to the hub axle, wherein the vehicle includes a chassis frame component provided with a wheel bearing fixing member, and one or both of the outer ring and the stator are removably fixed to the wheel bearing fixing member.

According to this configuration, since one or both of the outer ring and the stator are removably fixed to the wheel bearing fixing member, it is possible to remove an assembled body of the wheel bearing, etc., from the vehicle power unit by detaching the outer ring from the stator and detaching the outer ring or the stator from the wheel bearing fixing member when replacing the wheel bearing. Then, a new wheel bearing can be assembled into an assembled body, etc., in a reverse manner to the replacement described above. Thus, it is possible to easily replace only the wheel bearing, without replacing the motor, when the wheel bearing has abnormality or is deteriorated. This can alleviate replacement work of the components and reduce the costs of the replacement components.

The motor may include a rotary casing constituting an outer structure of the rotor, and the rotary casing and the hub flange may be removably fixed to each other in a bearing axial direction. In this case, the wheel bearing can be replaced by detaching the hub flange from the rotary casing, then detaching the outer ring from the stator, and detaching the outer ring or the stator from the wheel bearing fixing member. This makes it possible to easily remove the assembled body of the wheel bearing, etc., from the vehicle power unit in a bearing axial direction. Then, a new wheel bearing can be assembled into an assembled body, etc., in a reverse manner to the replacement described above.

The wheel bearing may be removable from the stator in a bearing axial direction, with the wheel bearing fixing member and the stator attached to the chassis frame component. In this case, the assembled body of the wheel bearing, etc., can be removed from the vehicle power unit in the bearing axial direction when replacing the wheel bearing, omitting the procedure of removing the entire vehicle power unit from the chassis frame component once. This can further promote reduction of workload.

The outer ring may include an outer ring main body having a raceway surface for the rolling element and an outer-ring outer peripheral body of an annular shape disposed on an outer peripheral surface of the outer ring main body; the outer-ring outer peripheral body may be removably fixed to the wheel bearing fixing member by a bolt; and a wheel bearing main body, including the outer ring main body, the rolling element and the hub axle, may be removable from the wheel bearing fixing member in a bearing axial direction, with the bolt removed from the outer-ring outer peripheral body. In this case, the wheel bearing main body can be easily removed from the vehicle power unit in the bearing axial direction by removing the bolt from the outer-ring outer peripheral body.

The outer-ring outer peripheral body may be located from an axially intermediate portion of the outer peripheral surface of the outer ring main body toward an outboard side; the outer ring may have an annular recess defined by an inboard side part of the outer peripheral surface of the outer ring main body and an inboard side end of the outer-ring outer peripheral body, the annular recess being recessed inward in a radial direction with respect to the outer peripheral surface of the outer-ring outer peripheral body; and the wheel bearing fixing member may be configured to be separably fitted to the annular recess. The axially intermediate portion is located at an arbitrary position defined by design or the like and may be, for example, defined at an appropriate position determined by one or both of testing and simulation. According to this configuration, the wheel bearing fixing member is separably fitted to the annular recess defined by the inboard side part of the outer peripheral surface of the outer ring main body and the inboard side end of the outer-ring outer peripheral body, so that the wheel bearing and the wheel bearing fixing member can be coaxially positioned in an accurate and easy manner.

The outer-ring outer peripheral body may be fixed to the outer peripheral surface of the outer ring main body through interference fitting. The interference fitting may be achieved by, for example, press fitting or shrink fitting. According to this configuration, a threaded hole for threadedly receiving the bolt may be formed in the outer-ring outer peripheral body which is a separate component from the outer ring main body. This eliminates the necessity of providing the outer-ring outer peripheral body as a separate component from the outer ring main body and forming a threaded hole in the outer ring itself, so that a so-called standardized wheel bearing can be used. This can promote cost reduction of the vehicle power unit.

The outer-ring outer peripheral body may have a protrusion protruding inward in the radial direction on an outboard side end face of the outer-ring outer peripheral body; and the outer ring main body, the wheel bearing fixing member and the outer-ring outer peripheral body may be fixed by the bolt, with opposite axial ends of the outer ring main body held between the protrusion and a part of the wheel bearing fixing member. In this case, the wheel bearing fixing member and the outer-ring outer peripheral body can be inserted onto the outer ring main body through clearance fitting, respectively, so that it is easy to disassemble.

According to the present invention, a vehicle wheel bearing assembly with a generator includes:

a wheel bearing including an outer ring and a hub axle that includes a hub flange and is rotatably supported by the outer ring through a rolling element, the hub flange being configured to be attached with a wheel and a brake rotor of a vehicle; and the generator including a stator located on an outer periphery of the outer ring and a rotor located on an outer periphery of the stator and attached to the hub axle, wherein the vehicle includes a chassis frame component provided with a wheel bearing fixing member, and one or both of the outer ring and the stator are removably fixed to the wheel bearing fixing member.

According to this configuration, since one or both of the outer ring and the stator are removably fixed to the wheel bearing fixing member, it is possible to remove an assembled body of the wheel bearing, etc., from the vehicle wheel bearing assembly with the generator by detaching the outer ring from the stator and detaching the outer ring or the stator from the wheel bearing fixing member when replacing the wheel bearing. Then, a new wheel bearing can be assembled into an assembled body, etc., in a reverse manner to the replacement described above. Thus, it is possible to easily replace only the wheel bearing, without replacing the generator, when the wheel bearing has abnormality or is deteriorated. This can alleviate replacement work of the components and reduce the costs of the replacement components.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
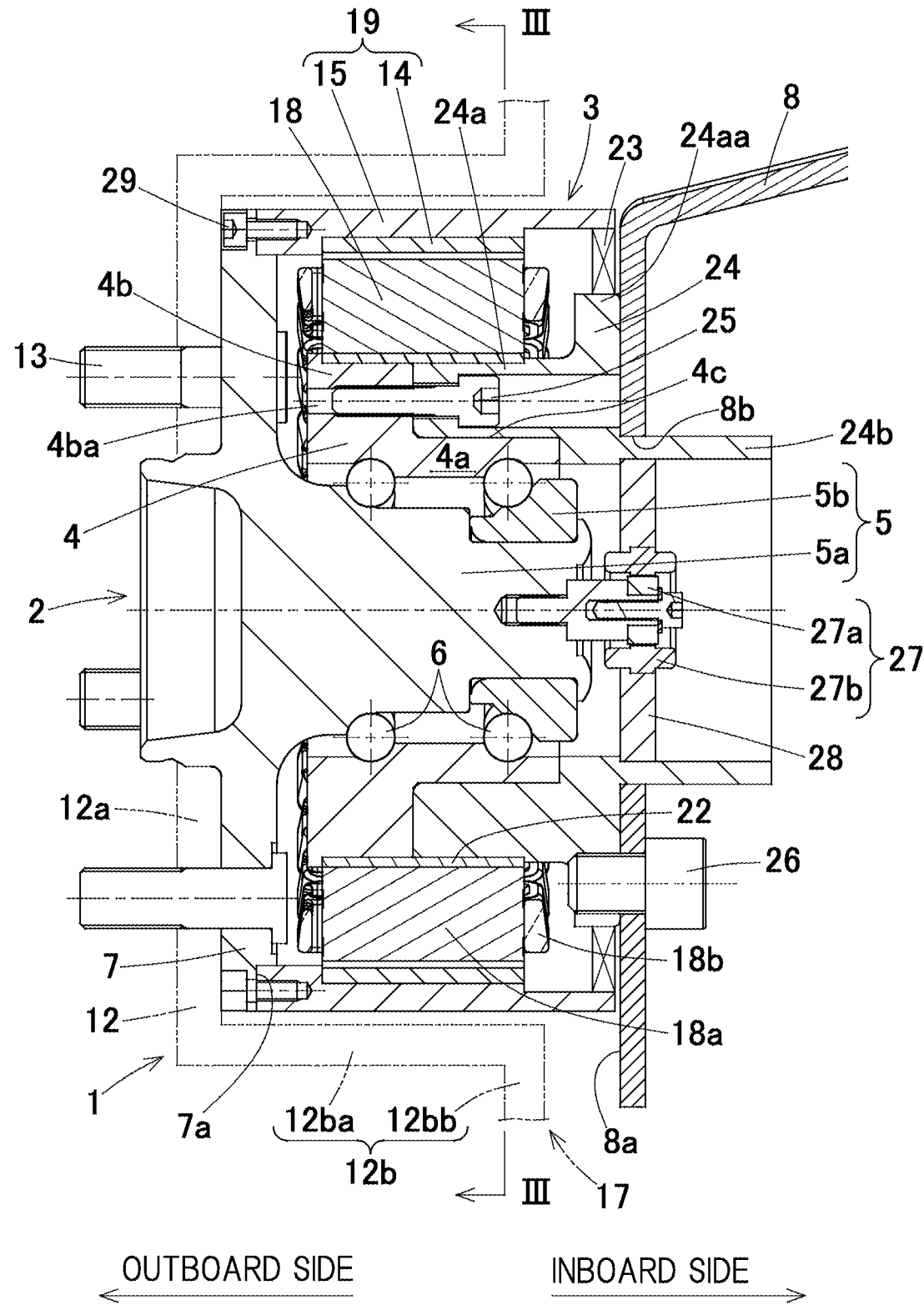
FIG. 1 is a sectional view of a vehicle power unit according to an embodiment of the present invention.

A vehicle power unit according to an embodiment of the present invention will be described with reference to FIG. 1 to FIG. 6. FIG. 1 is a sectional view (sectional view along line I-I of FIG. 2) of the vehicle power unit according to the embodiment. As shown in FIG. 1, the vehicle power unit 1 includes a wheel bearing 2 and a motor generator 3 which is a generator also serving as a motor.

Wheel Bearing 2

The wheel bearing 2 includes an outer ring 4 as a stationary ring, rolling elements 6 arranged in double rows, and a hub axle 5 as a rotary ring. A bearing space between the outer ring 4 and the hub axle 5 is filled with grease. The term "bearing axial direction" refers to a direction along a rotation axis of the wheel bearing 2, and the term "bearing radial direction" refers to a direction perpendicular to the rotation axis.

The outer ring 4 includes an outer ring main body 4a formed with double rows of raceway surfaces and an outer-ring outer peripheral body 4b disposed on an outboard side part of an outer peripheral surface of the outer ring main body 4a. In this example, the outer ring main body 4a and the outer-ring outer peripheral body 4b are integrally made of the same material. The outer-ring outer peripheral body 4b is disposed from an axially intermediate portion of the outer peripheral surface of the outer ring main body 4a toward an outboard side. The outer ring 4 has an annular recess 4c defined by an inboard side part of the outer peripheral surface of the outer ring main body 4a and an inboard side end of the outer-ring outer peripheral body 4b, the annular recess 4c being recessed inward in a radial direction with respect to the outer peripheral surface of the outer-ring outer peripheral body 4b.

The hub axle 5 includes a hub axle main body 5a and a partial inner ring 5b fitted to an outer peripheral surface of the hub axle main body 5a on an inboard side. The hub axle main body 5a includes a hub flange 7 at a position that protrudes toward the outboard side in the axial direction (bearing axial direction) with respect to the outer ring 4. A brake rotor 12 and a non-illustrated wheel rim are attached to an outboard side surface of the hub flange 7 by hub bolts 13 such that the brake rotor and the wheel rim are mutually overlapped in the axial direction. A non-illustrated tire is attached to an outer periphery of the rim. In the present description, the term "outboard side" refers to a side closer to an outside of a vehicle in a widthwise direction of the vehicle in a state where a vehicle power unit 1 is mounted in the vehicle, and the term "inboard side" refers to a side closer to a center of the vehicle in the widthwise direction of the vehicle.

A wheel bearing fixing member 24 for fixing the wheel bearing 2 to a knuckle 8 which is a chassis frame component of the vehicle is removably fixed to the wheel bearing 2 by a plurality of bolts 25. The wheel bearing fixing member 24 has a substantially cylindrical shape including a large-diameter cylindrical part 24a and a small-diameter cylindrical part 24b located on the inboard side of the large-diameter cylindrical part 24a.

The large-diameter cylindrical part 24a is disposed coaxially with the axis of the wheel bearing 2 on the outboard side of the knuckle 8. A vehicle mount flange 24aa is provided on an inboard side part of the outer peripheral surface of the large-diameter cylindrical part 24a. The vehicle mount flange 24aa is removably fixed to the knuckle 8 by a plurality of bolts 26. A stepped portion is formed on an outboard side part of an inner peripheral surface of the large-diameter cylindrical part 24a. The outer ring main body 4a has an inboard side end which is fitted to the stepped portion, so that the outer ring 4 is positioned in the axial direction.

The small-diameter cylindrical part 24b is disposed coaxially and integrally with the large-diameter cylindrical part 24a. The small-diameter cylindrical part 24b has an outer peripheral surface that has a smaller diameter than that of the outer peripheral surface of the large-diameter cylindrical part 24a. The knuckle 8 is formed with a through-hole 8b through which the small-diameter cylindrical part 24b can be inserted. The vehicle mount flange 24aa is fixed to an outboard side surface 8a of the knuckle 8, with the small-diameter cylindrical part 24b inserted through the through-hole 8b of the knuckle 8. The outer ring 4 is removably fixed to the wheel bearing fixing member 24 including the large-diameter cylindrical part 24a and the small-diameter cylindrical part 24b.

Figure 2:
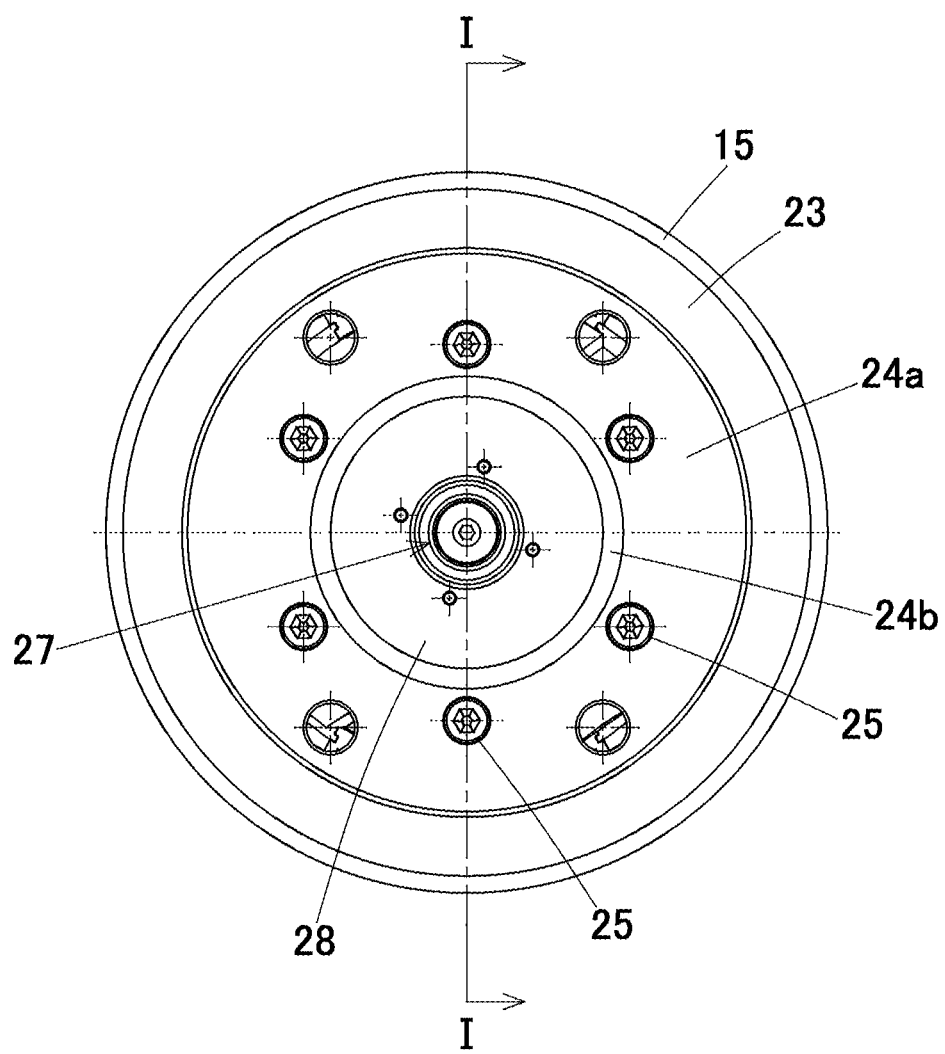
FIG. 2 is a side view of the vehicle power unit.

The large-diameter cylindrical part 24a is inserted onto the inboard side part of the outer peripheral surface of the outer ring main body 4a through clearance fitting, and the large-diameter cylindrical part 24a is fitted into the annular recess 4c defined by the inboard side part of the outer peripheral surface of the outer ring main body 4a and the inboard side end of the outer-ring outer peripheral body 4b. The outer-ring outer peripheral body 4b is also formed with a plurality of threaded holes 4ba at predetermined intervals in a circumferential direction, each of the threaded holes being a female thread extending in the axial direction. As shown in FIG. 1 and FIG. 2, the large-diameter cylindrical part 24a is formed with a plurality of bolt holes corresponding to the plurality of threaded holes 4ba. Each of the bolt holes has a through-hole through which a male thread of each bolt 25 is inserted and a counter bore hole connected to the through-hole. The bolts 25 are inserted to the respective bolt holes in the large-diameter cylindrical part 24a, and the bolts 25 are removably screwed into the threaded holes 4ba of the outer-ring outer peripheral body 4b.

Brake 17

Figure 11:
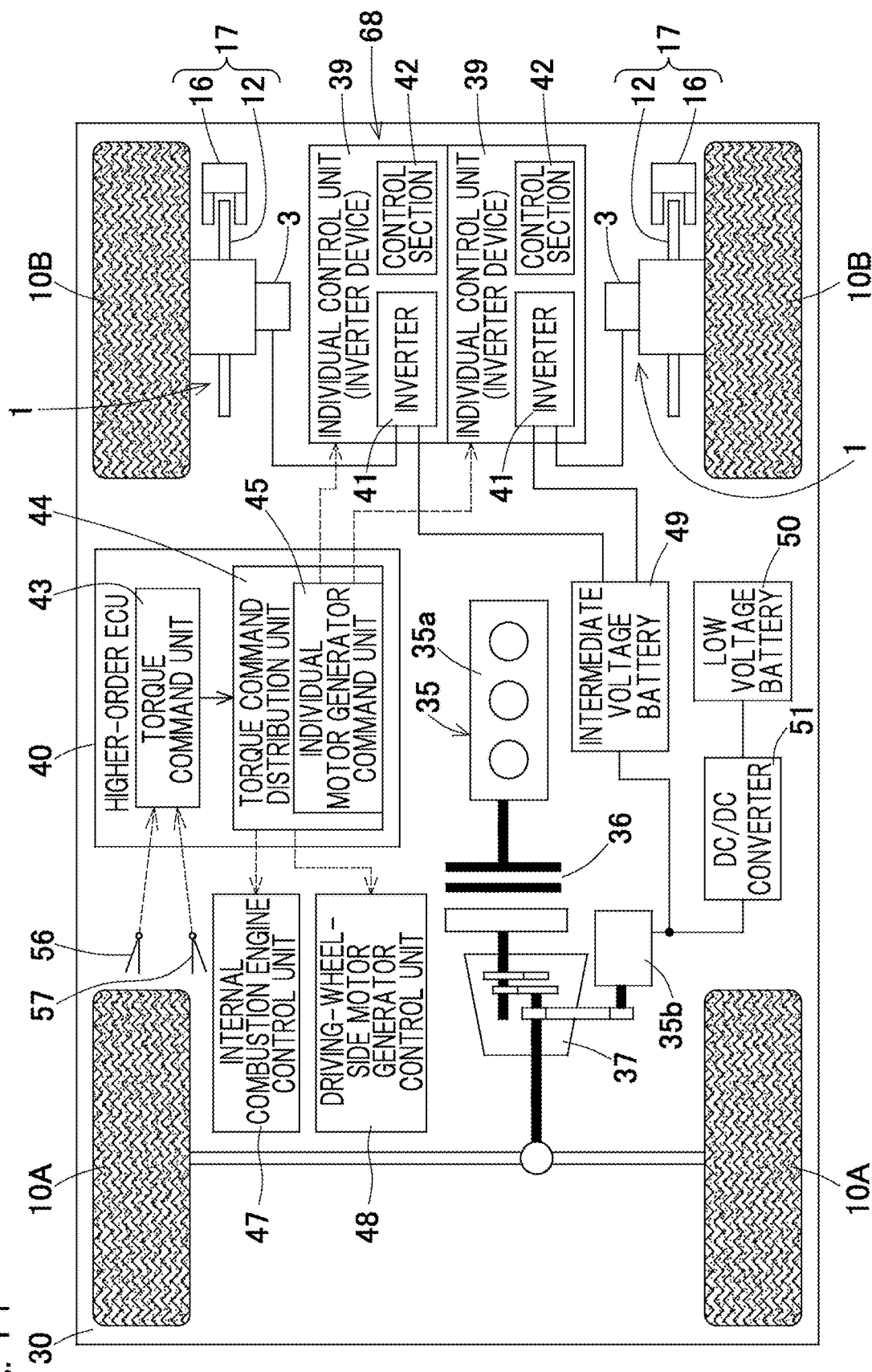
FIG. 11 is a block diagram illustrating a conceptual feature of a vehicle system for a vehicle including any of the vehicle power units.

As shown in FIG. 1, the brake 17 is a friction brake including a brake rotor 12 of a disk shape and a brake caliper 16 (FIG. 11). The brake rotor 12 includes a plate-like part 12a and an outer peripheral part 12b. The plate-like part 12a is an annular and plate-like member that is overlapped with the hub flange 7. The outer peripheral part 12b includes a cylindrical portion 12ba that extends from an outer peripheral edge portion of the plate-like part 12a toward the inboard side in a cylindrical manner and a plate portion 12bb that extends from an inboard side end of the cylindrical portion 12ba toward an outer diameter side in a plate-like manner.

The brake caliper 16 (FIG. 11) is attached to the knuckle 8 which is a chassis frame component of the vehicle (not illustrated), and includes friction pads (not illustrated) that hold the plate portion 12bb therebetween. The brake caliper 16 (FIG. 11) may be of a hydraulic or mechanical type. Alternatively, the brake caliper may be of an electric motor-driven type.

Motor Generator 3

Figure 3:
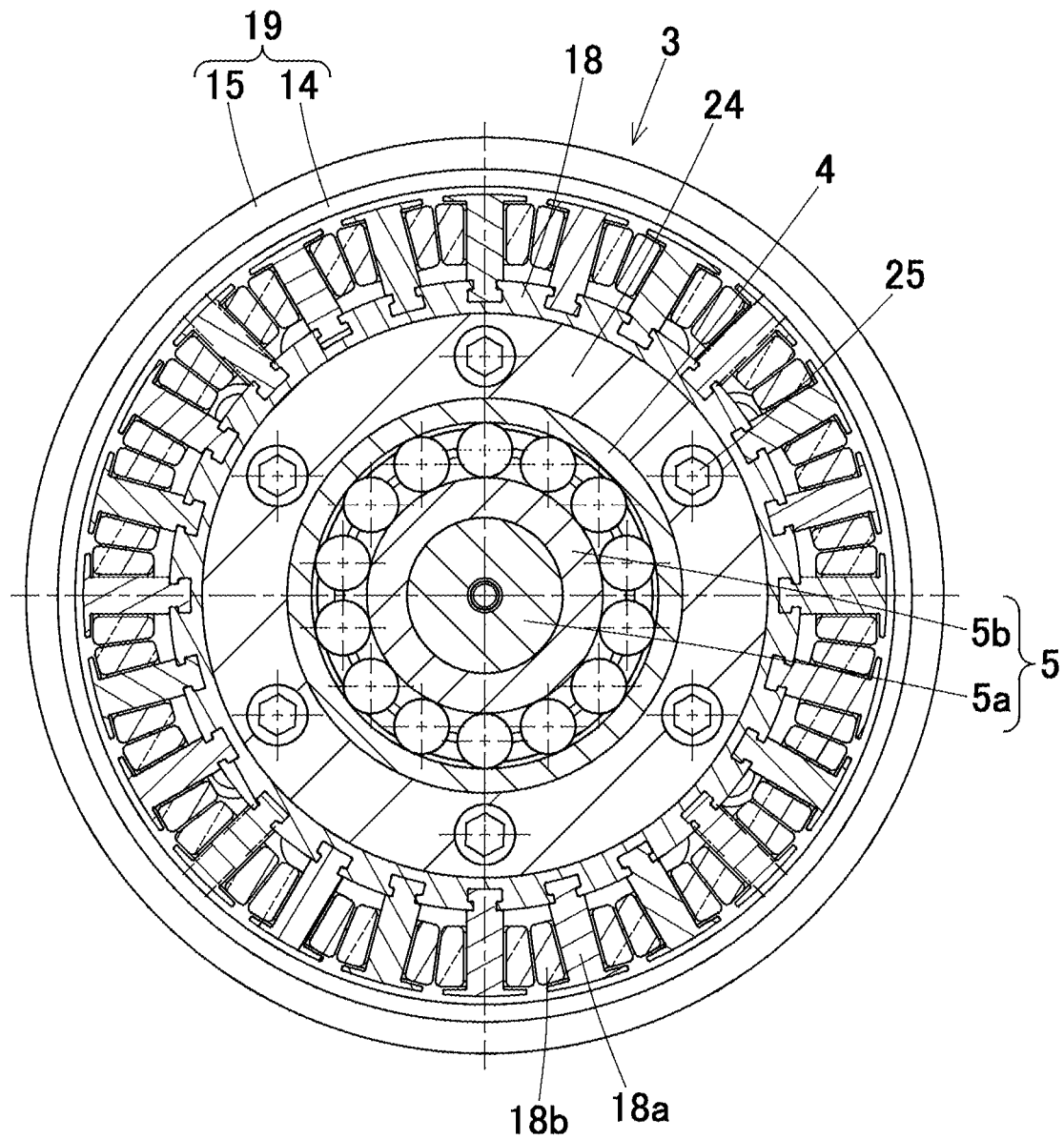
FIG. 3 is a sectional view along line III-III of FIG. 1.

As shown in FIG. 1 and FIG. 3, the motor generator 3 of this example is a motor generator for travel assistance which can generate power by rotation of a wheel and can be fed from an external source to rotatably drive the wheel. The motor generator 3 is of an outer rotor motor type which includes a stator 18 located on an outer periphery of the outer ring 4 and a rotor 19 located on an outer periphery of the stator 18 and attached to the hub axle 5. Alternatively, the motor generator 3 is of a direct drive type in which the rotor 19 is attached to the hub axle 5.

The motor generator 3 is disposed radially inward with respect to an inner diameter of the brake rotor 12 and within an axial range between the hub flange 7 and the outboard side surface 8*a* of the knuckle 8. For example, the motor generator 3 may be a surface permanent magnet motor of an outer-rotor type, i.e., an SPM (surface permanent magnet) synchronous motor (or also abbreviated as an SPMSM (surface permanent magnet synchronous motor)).

Alternatively, the motor generator 3 may be an IPM (interior permanent magnet) synchronous motor (or also abbreviated as an IPMSM (interior permanent magnet synchronous motor)). Besides, the motor generator 3 may be of any type, such as a switched reluctance motor (abbreviated as SR motor) and an induction motor (abbreviated as IM). In any of the motor types, the stator 18 may have any winding form, such as a distributed coil or a concentrated coil.

The rotor 19 includes a rotary casing 15 of a cylindrical shape that is removably fixed to an outer peripheral part of the hub flange 7 by bolts 29 and a plurality of permanent magnets 14 disposed on an inner peripheral surface of the rotary casing 15. The rotary casing 15 is made of, e.g., a soft magnetic material and has a cylindrical shape concentric with the hub axle 5. The hub flange 7 has an annular recess 7*a* formed on an inboard side surface of the outer peripheral part of the hub flange, and an outboard side end portion of the rotary casing 15 is spigot-fitted to the annular recess 7*a*. Also, the outboard side end portion of the rotary casing 15 is formed with a plurality of threaded holes at predetermined intervals in a circumferential direction, each of the threaded holes being a female thread extending in the axial direction. The outer peripheral part of the hub flange 7 is formed with a plurality of bolt holes corresponding to the plurality of threaded hole. The bolts 29 are screwed into the threaded holes.

A plurality of recessed portions are formed on the inner peripheral surface of the rotary casing 15 at equal intervals in the circumferential direction, and the permanent magnets 14 are fitted in the respective recessed portions and are e.g. bonded so as to be fixed. The rotary casing 15 may be formed as an integrated metal component by cutting or casting or be constituted by a plurality of divided structural bodies that are fixed together by, e.g., welding or bonding.

The stator 18 includes stator cores 18*a* arranged in an annular manner and stator coils 18*b* wound about the stator cores 18*a*. The stator cores 18*a* are made of, e.g., a silicon steel sheet, a powder magnetic core, and an amorphous alloy. The stator cores 18*a* are attached to the outer peripheral surface of the outer-ring outer peripheral body 4*b* of the outer ring 4 and to the outer peripheral surface of the large-diameter cylindrical part 24*a* of the wheel bearing fixing member 24 through an insulation layer 22. The stator cores 18*a* and the insulation layer 22 are removably attached to the outer peripheral surface of the outer-ring outer peripheral body 4*b*. The stator cores 18*a* and the insulation layer 22 are fitted and fixed to the outer peripheral surface of the large-diameter cylindrical part 24*a* through interference fitting or clearance fitting.

The insulation layer 22 is an insulation layer for preventing electric corrosion of the wheel bearing 2 and is made of, for example, a soft insulating material such as a resin material and a rubber material, or an insulating material such as ceramics. The insulation layer 22 has a substantially equivalent width dimension to that of the inner peripheral surface of the stator cores 18*a* and is shaped so as to cover the entire inner peripheral surface of the stator cores 18*a*. The insulation layer 22 has a radial thickness that is suitably adapted according to a drive voltage of the motor generator 3. Such an insulation layer 22 can block current flow to the rolling elements 6 so as to prevent electric corrosion of the wheel bearing 2. The insulation layer 22 may be formed by applying or spraying an insulating material to the inner peripheral surface of the stator cores 18*a*.

Sealing Structure

As shown in FIG. 1, a sealing member 23 for preventing entry of water and/or external objects into the inside of the motor generator 3 and the wheel bearing 2 is disposed between the inboard side part of the inner peripheral surface of the rotary casing 15 and the outer peripheral surface of the vehicle mount flange 24*aa*.

Rotation Detector 27

The vehicle power unit 1 includes a rotation detector 27. The rotation detector 27 is configured to detect a rotation angle or a rotation speed (or number of rotation per unit time) of the hub axle 5 with respect to the outer ring 4 in order to control the rotation of the motor generator 3 for drive assistance. The rotation detector 27 includes a to-be-detected part 27*a* and a sensor part 27*b* configured to detect the to-be-detected part 27*a*.

The to-be-detected part 27*a* is attached to, e.g., a to-be-detected part retaining member that is screwed into the inboard side end of the hub axle 5. The sensor part 27*b* is fixed to the inner peripheral surface of the small-diameter cylindrical part 24*b* of the wheel bearing fixing member 24 through a sensor fixing member 28. The rotation detector 27 may be, for example, a resolver. It should be noted that the rotation detector 27 is not limited to a resolver and may be any of, for example, an encoder, a pulser ring, and a hall sensor, irrespective of the types.

Replacement Procedure for Wheel Bearing 2

Figure 4:
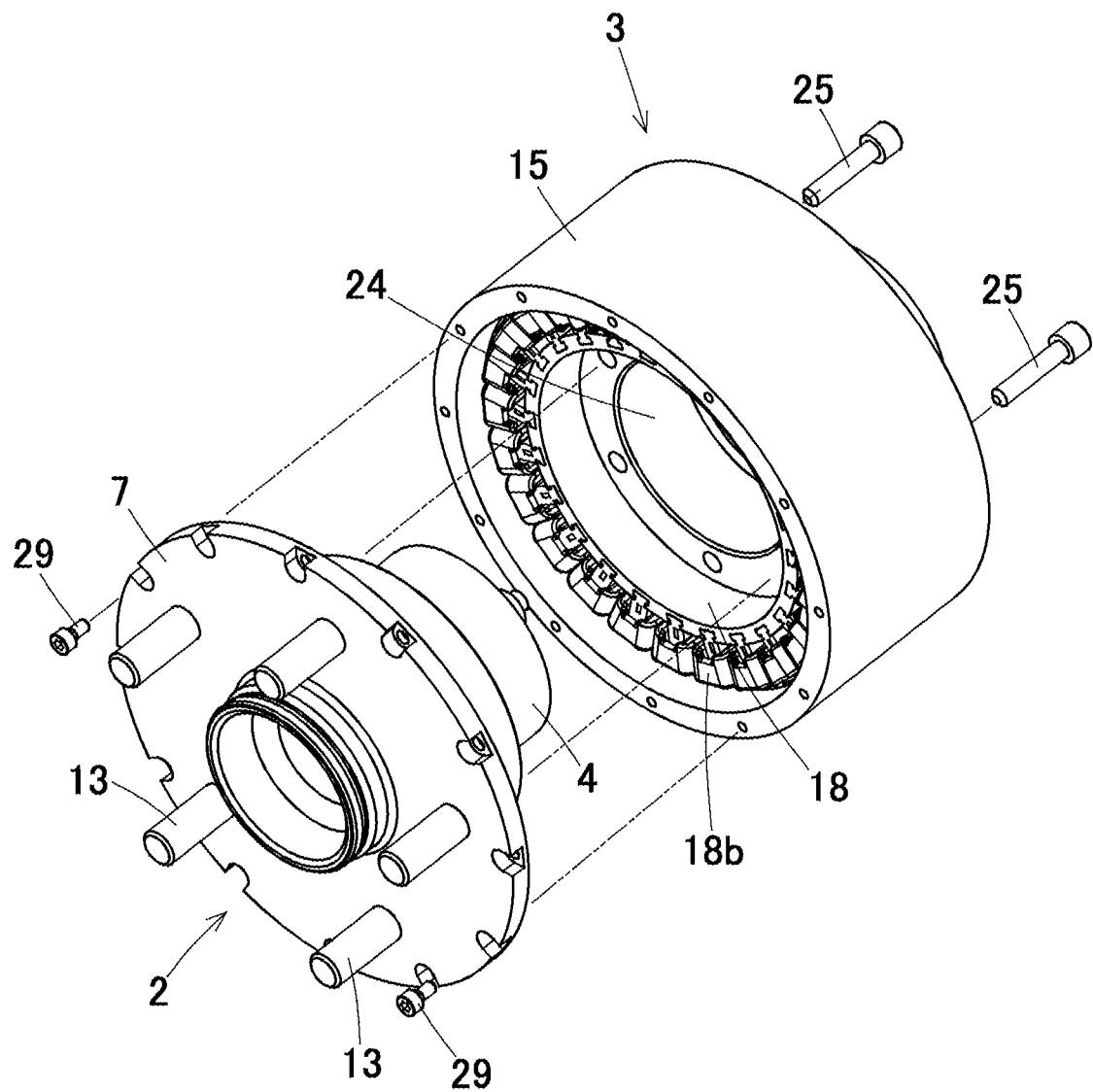
FIG. 4 is an exploded perspective view of the vehicle power unit.
Figure 5:
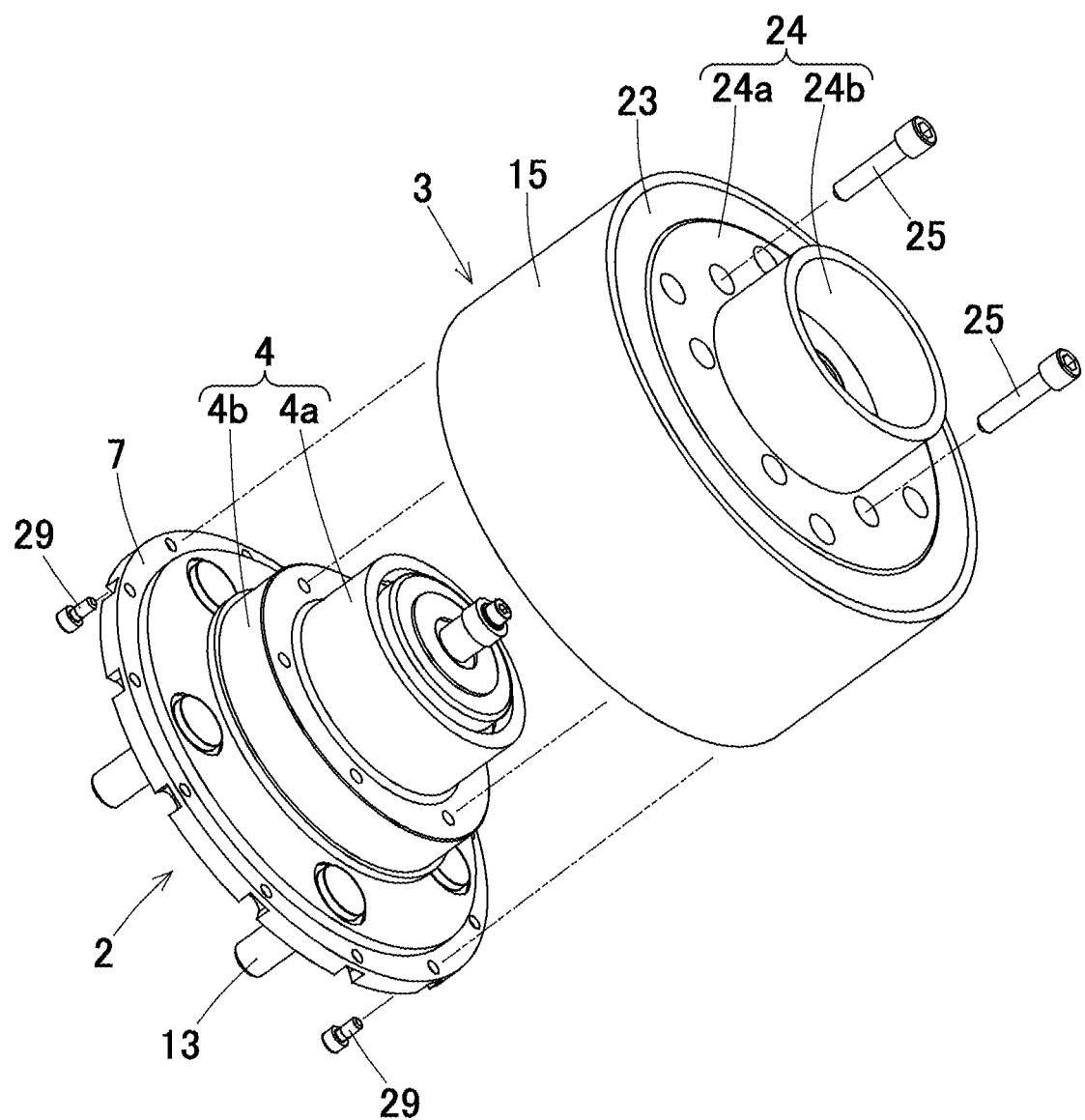
FIG. 5 is an exploded perspective view of the vehicle power unit when viewed from a different direction.
Figure 6:
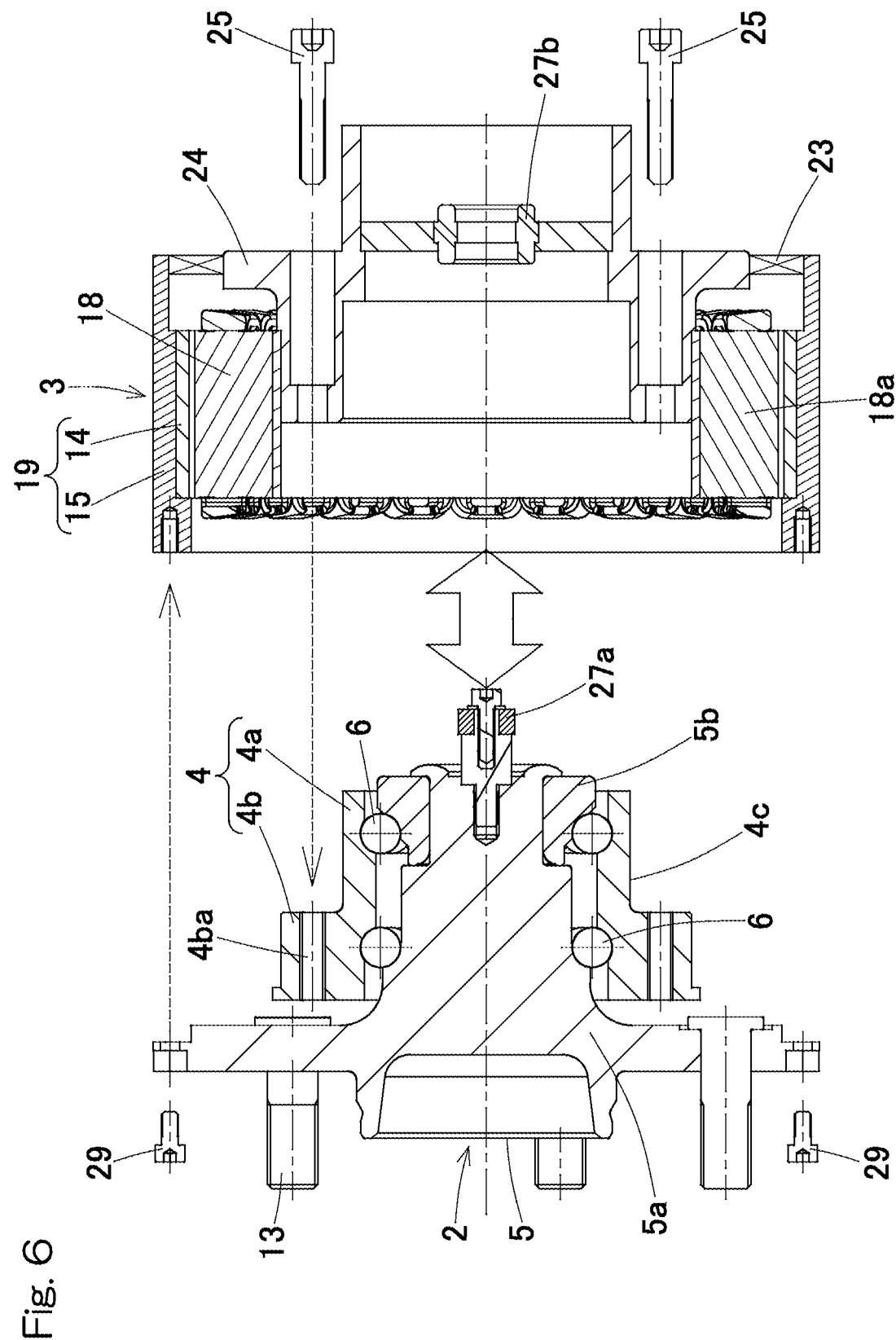
FIG. 6 is an exploded sectional view of the vehicle power unit.

As shown in FIG. 4 to FIG. 6, in the state where the vehicle power unit 1 is detached from the knuckle 8 (FIG. 1), the bolts 29 for fixing the rotary casing 15 and the hub flange 7 are removed. Then, the bolts 25 for fixing the outer ring 4 and the wheel bearing fixing member 24 are also removed. Next, an assembled body of the wheel bearing 2 including the outer ring 4, the rolling elements 6 and the hub axle 5 is removed from the motor generator 3 and the wheel bearing fixing member 24 in the bearing axial direction. Then, a new wheel bearing 2 is assembled into an assembled body in a reverse manner to the replacement described above.

EFFECTS AND ADVANTAGES

According to the above-described vehicle power unit 1, since the outer ring 4 is removably fixed to the wheel bearing fixing member 24, it is possible to remove the assembled body of the wheel bearing 2, etc., from the vehicle power unit 1 by detaching the outer ring 4 from the stator 18 in the bearing axial direction and detaching the outer ring 4 from the wheel bearing fixing member 24 in the bearing axial direction when replacing the wheel bearing 2. Then, a new wheel bearing 2 can be assembled into an assembled body, etc., in a reverse manner to the replacement described above. Thus, it is possible to easily replace only the wheel bearing 2, without replacing the motor generator 3, when the wheel bearing 2 has abnormality or is deteriorated. This can alleviate replacement work of the components and reduce the costs of the replacement components.

The wheel bearing fixing member 24 is fitted to the annular recess 4c defined by the inboard side part of the outer peripheral surface of the outer ring main body 4a and the inboard side end of the outer-ring outer peripheral body 4b, so that the wheel bearing 2 and the wheel bearing fixing member 24 can be coaxially positioned in an accurate and easy manner.

Other Embodiments

In the following description, features corresponding to those described for the above embodiment are denoted with like reference numerals, and overlapping description will not be repeated. Where description is made only to a part of a feature, other part of the feature is the same as that of the embodiment described above, unless specifically indicated otherwise. Like features provide like effects. Combination of parts is not limited to those specifically described in the respective embodiments, and parts of the embodiments can also be combined as long as such a combination does not particularly cause a problem.

Figure 7:
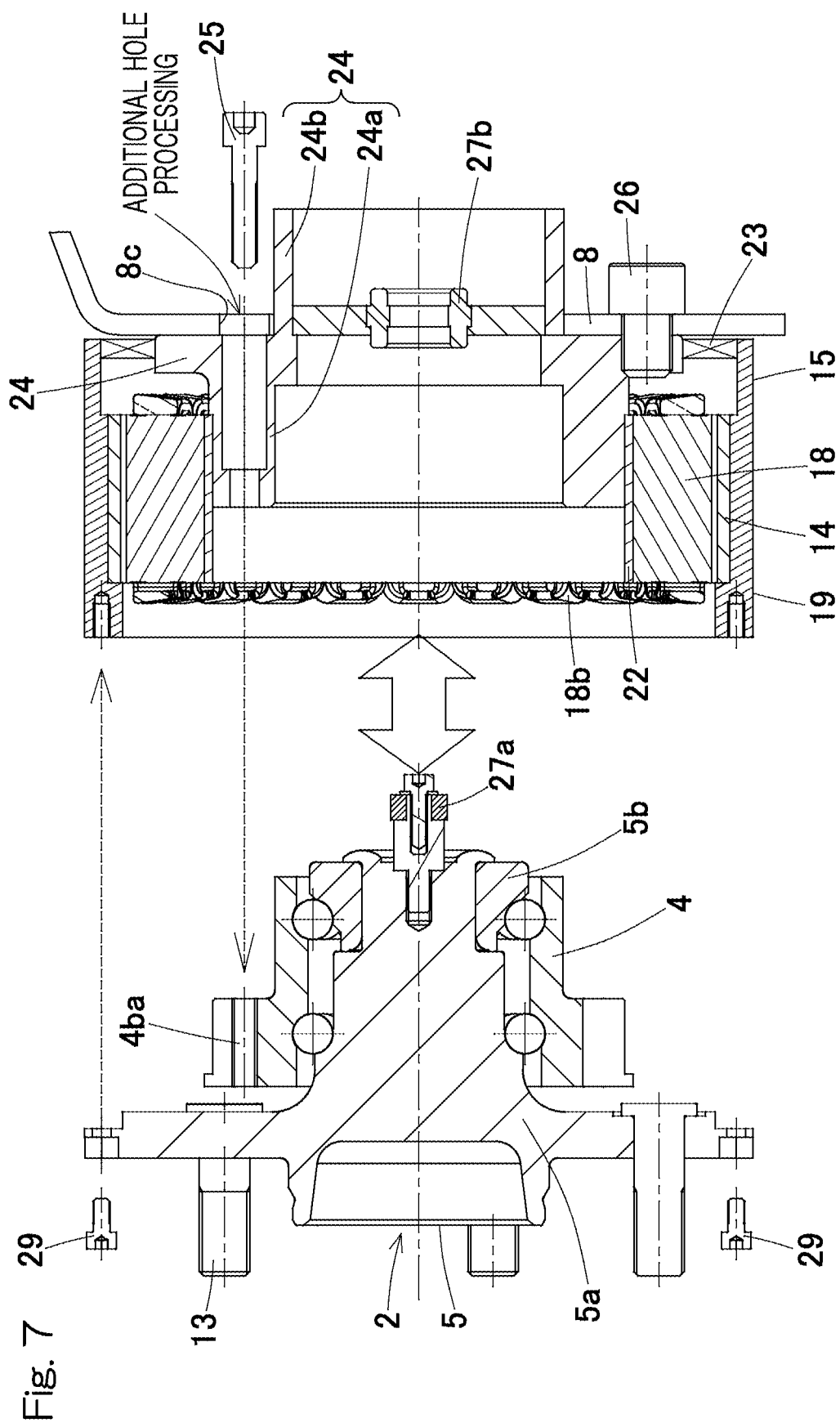
FIG. 7 is an exploded sectional view of a vehicle power unit according to another embodiment of the present invention.

As shown in FIG. 7, the wheel bearing 2 may be removable from the stator 18 and the wheel bearing fixing member 24 in the bearing axial direction, with the wheel bearing fixing member 24 and the stator 18 attached to the knuckle 8 (Vehicle body). The knuckle 8 may be additionally processed to provide holes 8c for removing the bolts 25, so that the wheel bearing 2 can be disassembled from the vehicle power unit, with the stator 18 etc. attached to the knuckle 8. Upon disassembly with the stator 18 etc. attached to the knuckle 8, the rotor 19 is fixed using a non-illustrated rotor holding tool before disassembling the wheel bearing so that the rotor 19 is not moved with respect to the knuckle 8 and the stator 18.

According to this configuration, the assembled body of the wheel bearing 2, etc., can be removed from the vehicle power unit in the bearing axial direction when replacing the wheel bearing 2, omitting the procedure of removing the entire vehicle power unit from the knuckle 8 once. This can further promote reduction of workload.

Figure 8:
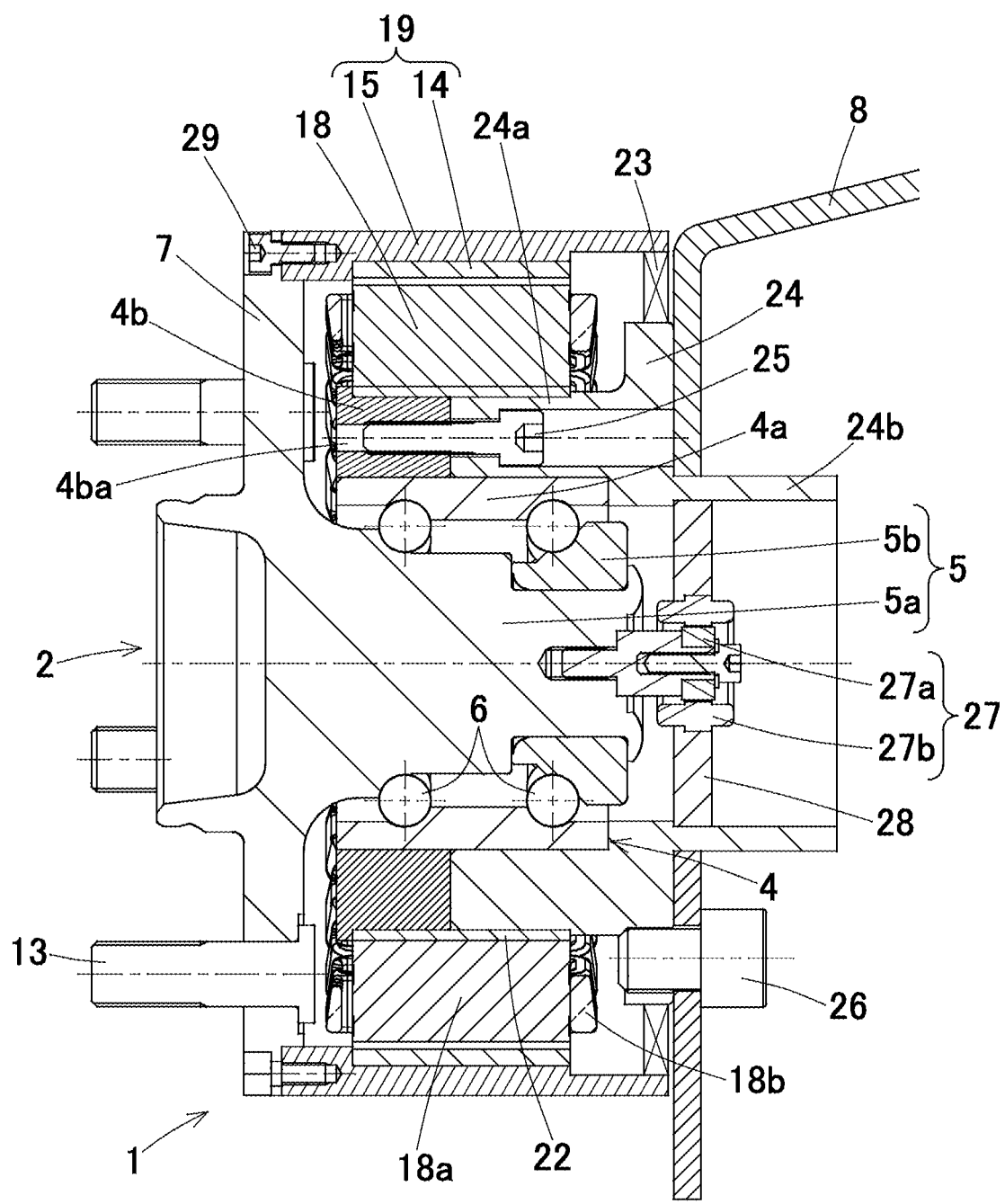
FIG. 8 is a sectional view of a vehicle power unit according to yet another embodiment of the present invention.

In addition, as shown in FIG. 8, the outer-ring outer peripheral body 4b may be provided as a separate component from the outer ring main body 4a and be fixed to the outer peripheral surface of the outer ring main body 4a through interference fitting, such as press fitting or shrink fitting. In this case, threaded holes 4ba for threadedly receiving the bolts 25 may be formed in the outer-ring outer peripheral body 4b which is a separate component from the outer ring main body 4a. This eliminates the necessity of providing the outer ring main body 4a as a separate component from the outer-ring outer peripheral body 4b and forming the threaded holes in the outer ring itself, so that a so-called standardized wheel bearing can be used. This can promote cost reduction of the vehicle power unit 1.

Figure 9:
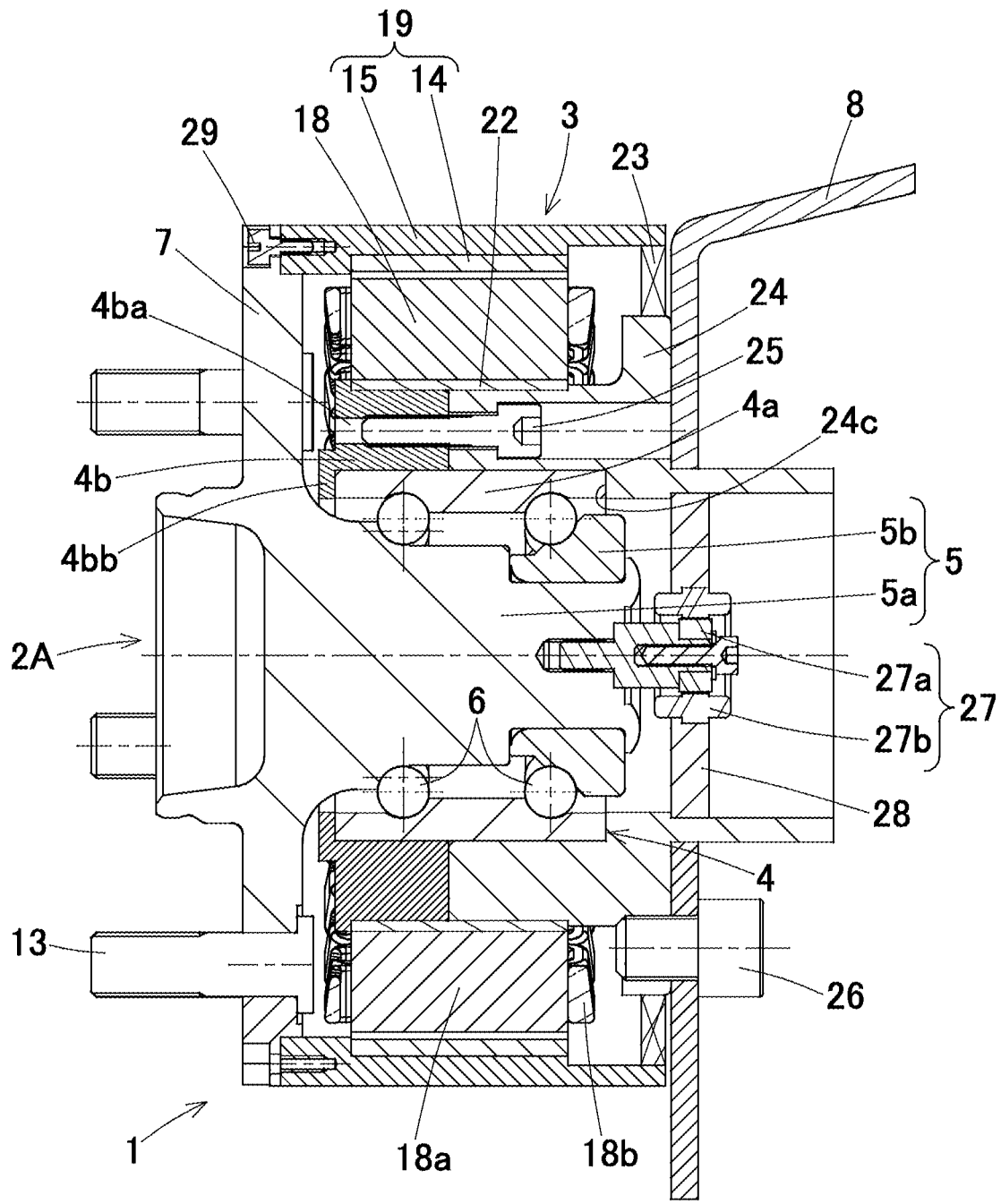
FIG. 9 is a sectional view of a vehicle power unit according to still another embodiment of the present invention.

Further, in the embodiment shown in FIG. 9, the outer-ring outer peripheral body 4b is a separate component from the outer ring main body 4a, and the outer-ring outer peripheral body 4b is inserted onto the outer ring main body 4a through clearance fitting. The outer-ring outer peripheral body 4b has a flange-like protrusion 4bb that protrudes inward in the radial direction on an outboard side end face of the outer-ring outer peripheral body. The outer ring main body 4a, the wheel bearing fixing member 24 and the outer-ring outer peripheral body 4b are fixed by the bolts 25, with opposite axial ends of the outer ring main body 4a held between an inboard-side contact surface of the protrusion 4bb and the stepped portion 24c that is a part of the wheel bearing fixing member 24.

According to this configuration, the wheel bearing fixing member 24 and the outer-ring outer peripheral body 4b can be inserted onto the outer ring main body 4a through clearance fitting, respectively, so that a wheel bearing main body 2A including the outer ring main body 4a, the rolling elements 6 and the hub axle 5 can be easily removed from the wheel bearing fixing member 24 in the bearing axial direction just by removing the bolts 25.

Figure 10:
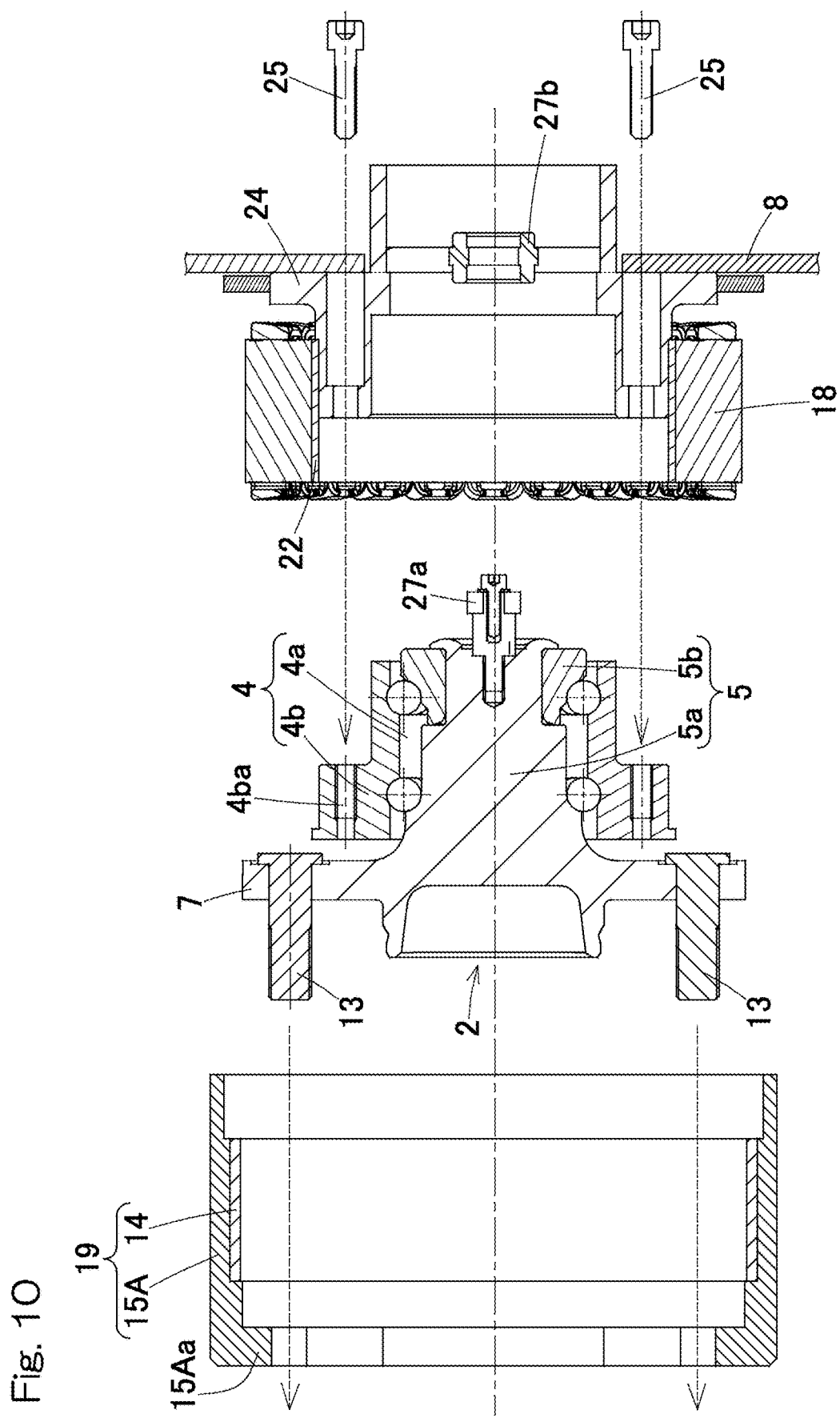
FIG. 10 is an exploded sectional view of a vehicle power unit according to yet another embodiment of the present invention.

As shown in FIG. 10, the rotor 19 and the wheel bearing 2 may be removed as a set from the wheel bearing fixing member 24 and the stator 18 in the bearing axial direction, with the wheel bearing fixing member 24 and the stator 18 attached to the knuckle 8. The rotary casing 15A of the rotor 19 has a bottomed cylindrical shape including a casing bottom part 15Aa at the outboard side end thereof. The casing bottom part 15Aa is a plate-like annular member held between the plate-like part 12a (FIG. 1) of the brake rotor 12 and the hub flange 7.

According to this configuration, the wheel bearing 2 and the rotor 19 can be easily removed from the vehicle power unit in the bearing axial direction, respectively. The rotor 19, the stator 18 and the wheel bearing fixing member 24 can be reused, while only the wheel bearing 2 is replaced.

Vehicle System

FIG. 11 is a block diagram illustrating a conceptual feature of a vehicle system including a vehicle power unit 1 according to any of the above embodiments. In this vehicle system, the vehicle power unit 1 is installed in a driven wheel 10B in a vehicle including the driven wheel 10B mechanically unconnected to a main drive source. A wheel bearing 2 (FIG. 1) in the vehicle power unit 1 is a bearing for supporting the driven wheel 10B.

The main drive source 35 may be an internal combustion engine such as a gasoline engine or a diesel engine, or a motor generator (electric motor), or a hybrid type drive source in which an internal combustion engine and a motor generator are combined. The term "motor generator" refers to an electric motor capable of generating power when rotation is applied. In the illustrated example, the vehicle 30 is a front-wheel drive vehicle including driving wheels 10A as front wheels and driven wheels 10B as rear wheels, and is a hybrid vehicle (hereinafter, sometimes referred to as "HEV") including main drive sources 35 including an internal combustion engine 35a and a driving-wheel-side motor generator 35b.

Specifically, the vehicle is of a mild hybrid type in which the driving-wheel-side motor generator 35b is driven at an intermediate voltage of, e.g., 48V. Hybrid vehicles are generally categorized into strong hybrids and mild hybrids: the mild hybrids refer to hybrid vehicles that have an internal combustion engine as a main drive source and use a motor mainly to assist travelling when they start moving and/or accelerate, and they are distinguished from the strong hybrids in that the mild hybrids can normally travel in an EV (electric vehicle) mode only for a while, but not for a long time. The internal combustion engine 35a in the illustrated example is connected to a drive shaft of the driving wheels 10A via a clutch 36 and a speed reduction gear or speed reducer 37, and the driving-wheel-side motor generator 35b is connected to the speed reduction gear 37.

The vehicle system includes: motor generators 3 that are generators for travel assistance that rotationally drive the driven wheels 10B; individual control units 39 that control the motor generators; and an individual motor generator command unit 45 that is provided in a higher order ECU 40 and outputs a command for causing the individual control units 39 to control driving and power regeneration. The motor generators 3 are connected to a power storage unit. The power storage unit may be, e.g., a battery (rechargeable battery) or a capacitor. Although the power storage unit may be of any type and be positioned anywhere in the vehicle 30, in this embodiment, it corresponds to an intermediate voltage battery 49, among a low voltage battery 50 and the intermediate voltage battery 49 installed in the vehicle 30.

The motor generators 3 for the driven wheels are direct drive motors in which no speed reduction gear is used. The motor generators 3 operate as electric motors when supplied with power and also serve as generators for converting kinetic energy of the vehicle 30 into electric power. Since each motor generator 3 has a rotor 19 (FIG. 1) attached to an inner ring 5 (FIG. 1), the inner ring 5 (FIG. 1) is rotationally driven when current is applied to the motor generator 3, whereas regenerative power is generated when an induction voltage is applied during power regeneration. The motor generator 3 has a drive voltage for rotationally driving or a regenerative voltage of 100 V or lower.

Control System of Vehicle 30

The higher order ECU40 is a unit for performing integrated control of the vehicle 30 and includes a torque command generation unit 43. The torque command generation unit 43 generates a torque command in accordance with a signal of an operation amount inputted from each of an accelerator operation unit 56 (such as an accelerator pedal) and a brake operation unit 57 (such as a brake pedal). The vehicle 30 includes an internal combustion engine 35a and a driving-wheel-side motor generator 35b as main drive sources 35 as well as two motor generators 3, 3 for driving the two respective driven wheels 10B, 10B. Accordingly, the higher order ECU 40 is provided with a torque command distribution unit 44 for distributing the torque command(s) to the respective drive sources 35a, 35b, 3, 3 in accordance with a predetermined rule.

A torque command to the internal combustion engine 35a is transmitted to an internal combustion engine control unit 47 and is used, e.g., to control a valve opening degree by the internal combustion engine control unit 47. A torque command to the driving-wheel-side motor generator 35b is transmitted to and executed on a driving-wheel-side motor generator control unit 48. Torque commands to the generators 3, 3 on the driven wheel side are transmitted to the individual control units 39, 39. The individual motor generator command unit 45 refers to a section of the torque command distribution unit 44 which performs output to the individual control units 39, 39. The individual motor generator command unit 45 also has a function of providing each individual control unit 39 with a torque command that is a command of a distributed braking force to be produced by each motor generator 3 through regenerative braking in response to a signal of an operation amount from the brake operation unit 57. The individual motor generator command unit 45 and the individual control units 39 constitute a control unit 68 for controlling the motor generators 3.

Each of the individual control units 39 is an inverter device and includes: an inverter 41 for converting direct current from the intermediate voltage battery 49 into a three-phrase alternating current voltage; and a control section 42 for controlling an output of the inverter 41 in accordance with, e.g., the torque command, by, e.g., PWM control. The inverter 41 includes: a bridge circuit (not illustrated) in the form of, e.g., a semi-conductor switching element; and a charge circuit (not illustrated) for charging regenerative power from the motor generator 3 to the intermediate voltage battery 49. It should be noted that although each of the individual control units 39 is separately provided to each of the two motor generators 3, 3, the two individual control units 39, 39 may be disposed in a single enclosure and share a control section 42 in common.

Figure 12:
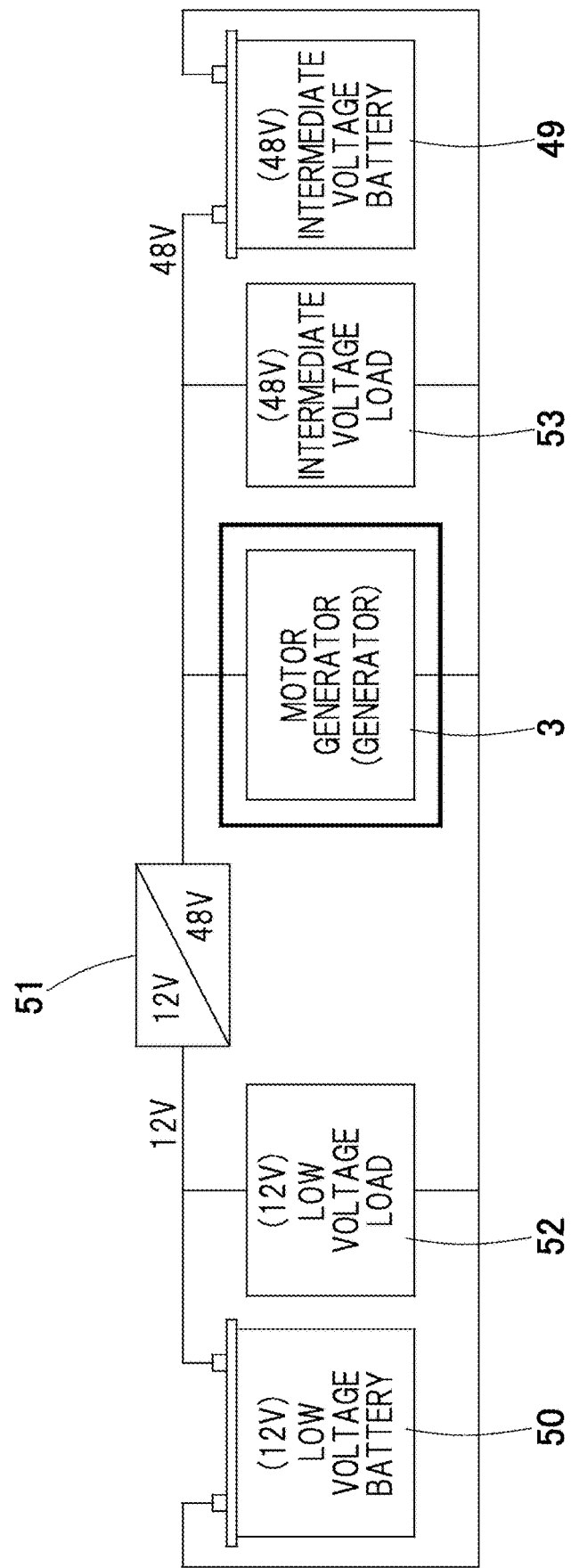
FIG. 12 is a power system diagram as an example of a vehicle including the vehicle system.

FIG. 12 is a power system diagram of an exemplary vehicle (FIG. 11) equipped with the vehicle system. In the example of FIG. 12, there are a low voltage battery 50 and an intermediate voltage battery 49 as batteries, and the batteries 49, 50 are connected through a DC/DC convertor 51. There are two motor generators 3, but only one of them is illustrated as a representative. Although the driving-wheel-side motor generator 35b in FIG. 11 is not illustrated in FIG. 12, it is connected to an intermediate voltage system in parallel with the motor generator 3 on the driven wheel side. A low voltage load 52 is connected to a low voltage system, and an intermediate voltage load 53 is connected to the intermediate voltage system. There are a plurality of the low voltage loads 52 and a plurality of the intermediate voltage loads 53, but only one for each load is illustrated as a representative.

The low voltage battery 50 is a battery that is commonly used as a power source for, e.g., a control system in various automobiles, and may be, for example, 12 V or 24 V. The low voltage load 52 may include a starter motor of the internal combustion engine 35a, lights, and key components, such as the higher order ECU 40 and other ECU (not illustrated). The low voltage battery 50 may be also called as an auxiliary battery for electric accessories, and the intermediate voltage battery 49 may be also called as an auxiliary battery for an electric system.

The intermediate voltage battery 49 has a voltage higher than that of the low voltage battery 50 but lower than that of a high voltage battery (100 V or higher, for example, about 200 to 400 V) used for, e.g., strong hybrid vehicles, the voltage having a negligible influence to a human body when an electric shock occurs during operation. The intermediate voltage battery may preferably be a 48-V battery that are used in mild hybrids in recent years. The intermediate voltage battery 49, such as a 48-V battery, can be relatively easily installed in a vehicle equipped with a conventional internal combustion engine, and such a vehicle can be converted into a mild hybrid so as to reduce fuel consumption by power assistance and/or regeneration by electric power.

The intermediate voltage loads 53 in the 48-V system are the accessory components, including the power-assist motor that is the driving-wheel-side motor generator 35b, an electric pump, an electric power steering, a supercharger, an air compressor, or the like. Since the loads from the accessories are set up as the 48-V system, the system can reduce the possibility of an electric shock to a passenger or a maintenance operator, although the system can provide a reduced output of power assistance compared with that of a high voltage system (such as a strong hybrid vehicle with a voltage of 100 V or higher). The system also allows an insulation coating for wiring to be thin, so that the weight and/or volume of the wiring can be reduced. In addition, the system can input/output a larger electric power with a smaller amount of current than that of a 12-V system, so that the volume of the electric motor or the generator can be reduced. Thus, the system contributes to the effect of reducing fuel consumption of the vehicle.

This vehicle system is suitable for accessory components of such a mild hybrid vehicle and is applied as a power-assist and power-regenerative component. It should be noted that although conventionally, a mild-hybrid vehicle sometimes includes a CMG (crankshaft motor-driven generator), a GMG (gearbox motor-driven generator), or a belt-drive starter motor (none of them are illustrated), all of these are affected by efficiency of a transmission device and a speed reduction gear because they perform power assistance or power regeneration for an internal combustion engine or a power device.

In contrast, since the vehicle system of this embodiment is mounted in the driven wheel 10B, the vehicle system is unconnected to the main drive sources such as the internal combustion engine 35a and the electric motor (not illustrated) and can directly use kinetic energy of the vehicle body on power regeneration. In cases where a CMG, or a GMG, or a belt-drive starter motor is provided, its incorporation has to be taken into consideration from a designing phase of the vehicle 30, and thus it is difficult to retrofit these components.

In contrast, the motor generator 3 of this vehicle system, which can be accommodated inside the driven wheel 10B, can be attached even to a finished vehicle in a number of steps equivalent to that for replacing a component, making it possible to set up a 48-V system even to the finished vehicle including only an internal combustion engine 35a. An existing vehicle including only an internal combustion engine 35a can be converted into a mild hybrid vehicle by installing a vehicle power device 1 according to any of the above embodiments and the intermediate voltage battery 49 having a drive voltage or a regenerative voltage of 100 V or lower as a battery for the motor generator, without significant modifications of the vehicle. The vehicle installed with the vehicle system according to this embodiment may be provided with a different motor generator 35b for auxiliary driving, as in the example shown in FIG. 11. In such a case, an amount of power assistance or an amount of regenerative power provided to the vehicle 30 can be increased, contributing to further reduction in fuel consumption.

Figure 13:
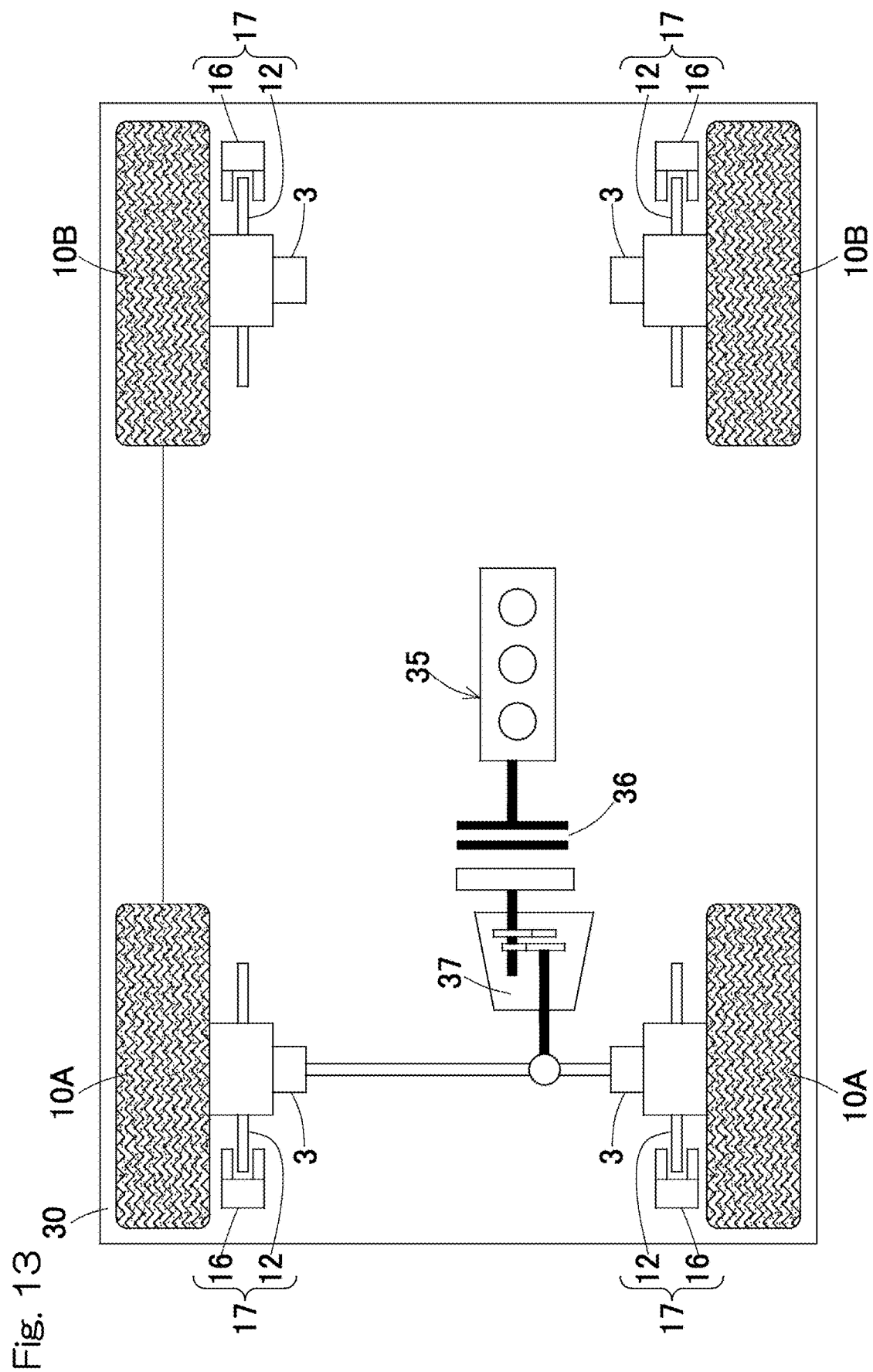
FIG. 13 illustrates conceptual features of a vehicle system for another vehicle including the vehicle power unit.
Figure 14:
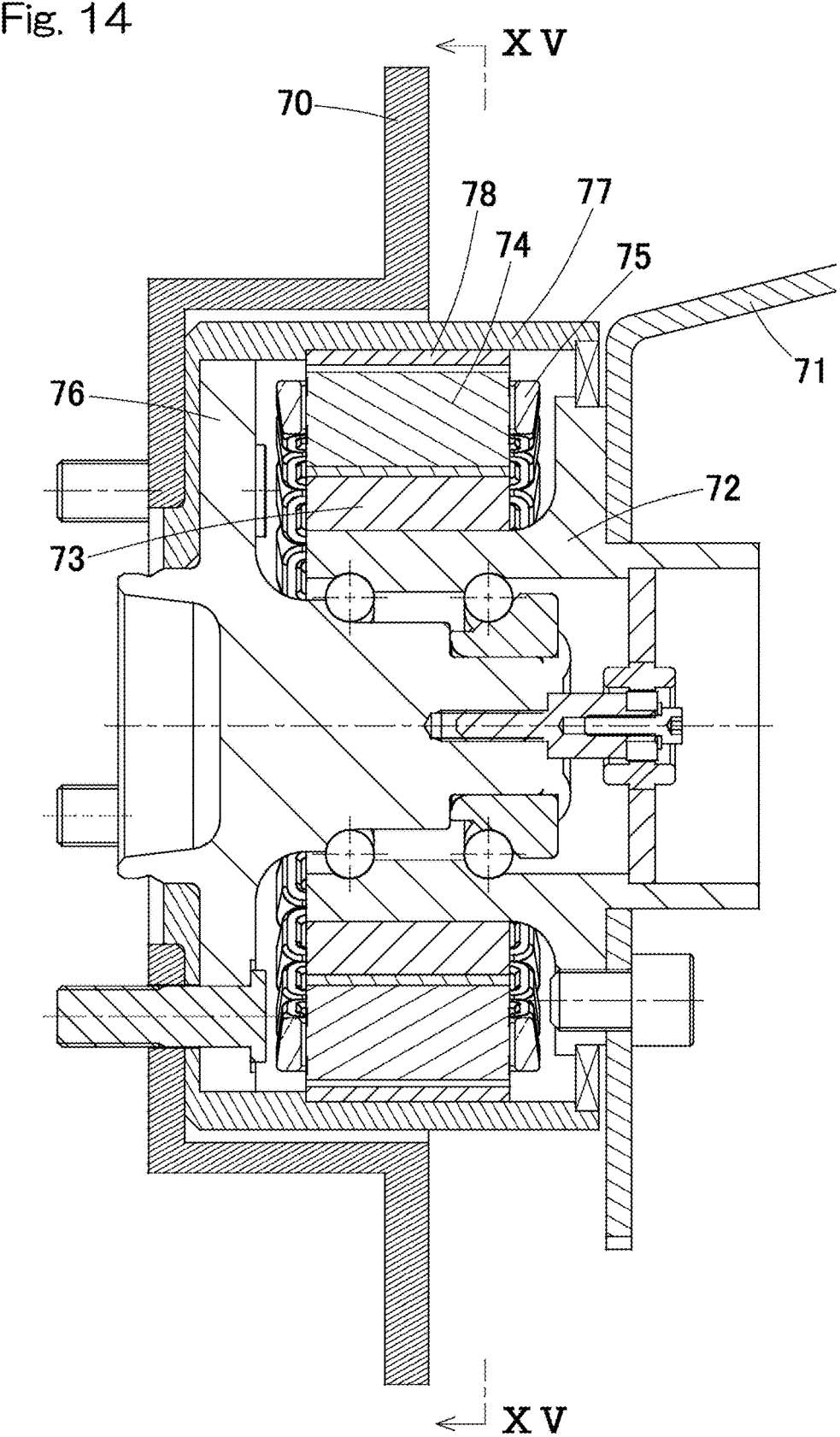
FIG. 14 is a sectional view of a vehicle power unit including a drive motor having a power generation function that has previously been proposed.
Figure 15:
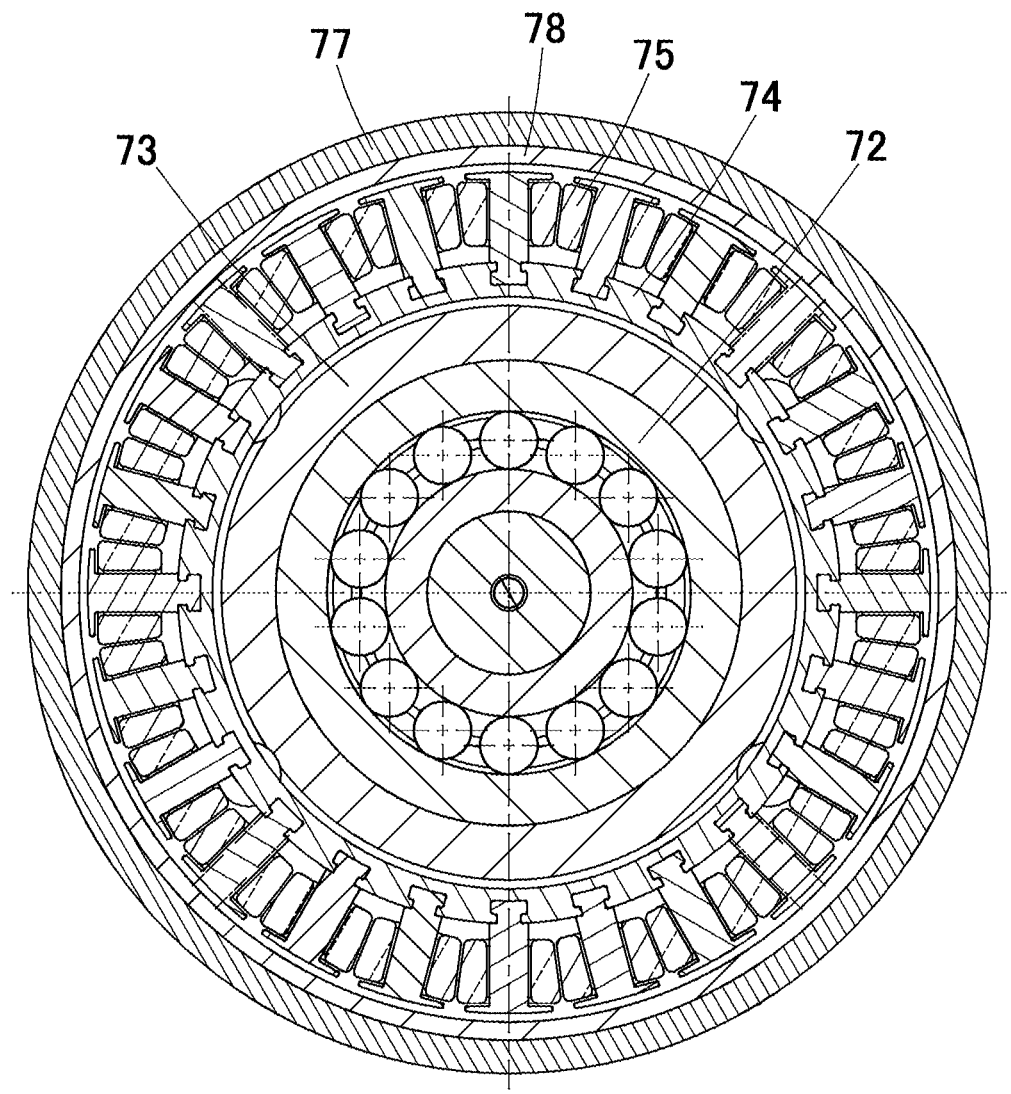
FIG. 15 is a sectional view along XV-XV of FIG. 14.

FIG. 13 shows an example in which vehicle power units 1 according to any of the embodiments are applied to driving wheels 10A as front wheels and driven wheels 10B as rear wheels. The driving wheels 10A are driven by a main drive source 35 including an internal combustion engine through a clutch 36 and a speed reduction gear 7. This front-wheel drive vehicle includes the to vehicle power units 1 for supporting and auxiliarily driving the respective driving wheels 10A and driven wheels 10B. In such a way, the vehicle power units 1 may be applied not only to the driven wheels 10B but also to the driving wheels 10A.

The vehicle system shown in FIG. 11 may be a system that has a function of generating power but does not perform rotational drive when supplied with power. This vehicle system includes a vehicle wheel bearing assembly with generator, which includes a motor generator 3 that does not serve as a motor, and a wheel bearing 2. The vehicle wheel bearing assembly with generator has the same configuration as that of a vehicle power unit according to any of the embodiments, except for the motor generator 3 that also serves as a motor.

According to the vehicle system including the vehicle wheel bearing assembly with generator, regenerative power generated by the motor generator 3 can be stored in the intermediate voltage battery 49 so that a braking force can be generated. Appropriate use of such a system in combination with or alternative to the mechanical brake operation unit 57 makes it possible to improve braking performance. Thus, when limited to the function of generating power, each individual control unit 39 may be in the form of an AC/DC converter device (not illustrated), instead of an inverter device. The AC/DC converter device has a function of converting three-phase alternating current voltage to direct current voltage so as to charge the intermediate voltage battery 49 with the regenerative power from the motor generator 3 and can be controlled more easily than an inverter, so that the AC/DC converter device can have a more compact configuration.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . Vehicle power unit
2 . . . Wheel bearing
2A . . . Wheel bearing main body
3 . . . Motor generator (motor, generator)
4 . . . Outer ring
4a . . . Outer ring main body
4b . . . Outer-ring outer peripheral body
4bb . . . Protrusion
4c . . . Annular recess
5 . . . Hub axle
6 . . . Rolling element
7 . . . Hub flange
8 . . . Knuckle (chassis frame component)
12 . . . Brake rotor
15 . . . Rotary casing
18 . . . Stator
19 . . . Rotor
24 . . . Wheel bearing fixing member
24c . . . Stepped portion
25 . . . Bolt

What is claimed is:

1. A vehicle power unit comprising:
a wheel bearing including an outer ring and a hub axle that includes a hub axle main body and a hub flange and is rotatably supported by the outer ring through a rolling element, the hub flange being configured to be attached with a wheel and a brake rotor of a vehicle; and
a motor including a stator located on an outer periphery of the outer ring and a rotor located on an outer periphery of the stator and attached to the hub axle,
wherein
the vehicle includes a chassis frame component provided with a wheel bearing fixing member for fixing the wheel bearing to the chassis frame component, and
an assembled body of the wheel bearing including the outer ring, the rolling element and the hub axle are removably fixed to the motor and the wheel bearing fixing member with the outer ring being removably fixed to the wheel bearing fixing member so that the assembled body is removable from the motor and the wheel bearing fixing member in a bearing axial direction with the wheel bearing fixing member, the rotor and the stator staying attached to the chassis frame component.

2. The vehicle power unit as claimed in claim 1, wherein the motor includes a rotary casing constituting an outer structure of the rotor, and the rotary casing and the hub flange are removably fixed to each other in the bearing axial direction.

3. The vehicle power unit as claimed in claim 1, wherein the wheel bearing is removable from the stator in the bearing axial direction, with the wheel bearing fixing member and the stator attached to the chassis frame component.

4. The vehicle power unit as claimed in claim 1, wherein the outer ring includes an outer ring main body having a raceway surface for the rolling element and an outer-ring outer peripheral body of an annular shape disposed on an outer peripheral surface of the outer ring main body;
  the outer-ring outer peripheral body is removably fixed to the wheel bearing fixing member by a bolt; and
  a wheel bearing main body, including the outer ring main body, the rolling element and the hub axle, is removable from the wheel bearing fixing member in the bearing axial direction, with the bolt removed from the outer-ring outer peripheral body.

5. The vehicle power unit as claimed in claim 4, wherein the outer-ring outer peripheral body is located from an axially intermediate portion of the outer peripheral surface of the outer ring main body toward an outboard side;
  the outer ring has an annular recess defined by an inboard side part of the outer peripheral surface of the outer ring main body and an inboard side end of the outer-ring outer peripheral body, the annular recess being recessed inward in a radial direction with respect to the outer peripheral surface of the outer-ring outer peripheral body;
  the wheel bearing fixing member is configured to be separably fitted to the annular recess.

6. The vehicle power unit as claimed in claim 4, wherein the outer-ring outer peripheral body is fixed to the outer peripheral surface of the outer ring main body through interference fitting.

7. A vehicle power unit comprising:
  a wheel bearing including an outer ring and a hub axle that includes a hub flange and is rotatably supported by the outer ring through a rolling element, the hub flange being configured to be attached with a wheel and a brake rotor of a vehicle; and
  a motor including a stator located on an outer periphery of the outer ring and a rotor located on an outer periphery of the stator and attached to the hub axle,
  wherein
    the vehicle includes a chassis frame component provided with a wheel bearing fixing member, and
    one or both of the outer ring and the stator are removably fixed to the wheel bearing fixing member,
  wherein the outer ring includes an outer ring main body having a raceway surface for the rolling element and an outer-ring outer peripheral body of an annular shape disposed on an outer peripheral surface of the outer ring main body;
  the outer-ring outer peripheral body is removably fixed to the wheel bearing fixing member by a bolt; and
  a wheel bearing main body, including the outer ring main body, the rolling element and the hub axle, is removable from the wheel bearing fixing member in a bearing axial direction, with the bolt removed from the outer-ring outer peripheral body,
  wherein the outer-ring outer peripheral body has a protrusion protruding inward in a radial direction on an outboard side end face of the outer-ring outer peripheral body; and
  the outer ring main body, the wheel bearing fixing member and the outer-ring outer peripheral body are fixed by the bolt, with opposite axial ends of the outer ring main body held between the protrusion and a part of the wheel bearing fixing member.

8. A vehicle wheel bearing assembly with a generator comprising:
  a wheel bearing including an outer ring and a hub axle that includes a hub axle main body and a hub flange and is rotatably supported by the outer ring through a rolling element, the hub flange being configured to be attached with a wheel and a brake rotor of a vehicle; and
  the generator including a stator located on an outer periphery of the outer ring and a rotor located on an outer periphery of the stator and attached to the hub axle,
  wherein
    the vehicle includes a chassis frame component provided with a wheel bearing fixing member for fixing the wheel bearing to the chassis frame component, and
    an assembled body of the wheel bearing including the outer ring, the rolling element and the hub axle are removably fixed to the generator and the wheel bearing fixing member with the outer ring being removably fixed to the wheel bearing fixing member so that the assembled body is removable from the generator and the wheel bearing fixing member in a bearing axial direction with the wheel bearing fixing member, the rotor and the stator staying attached to the chassis frame component.

* * * * *